United States Patent Office 3,484,492
Patented Dec. 16, 1969

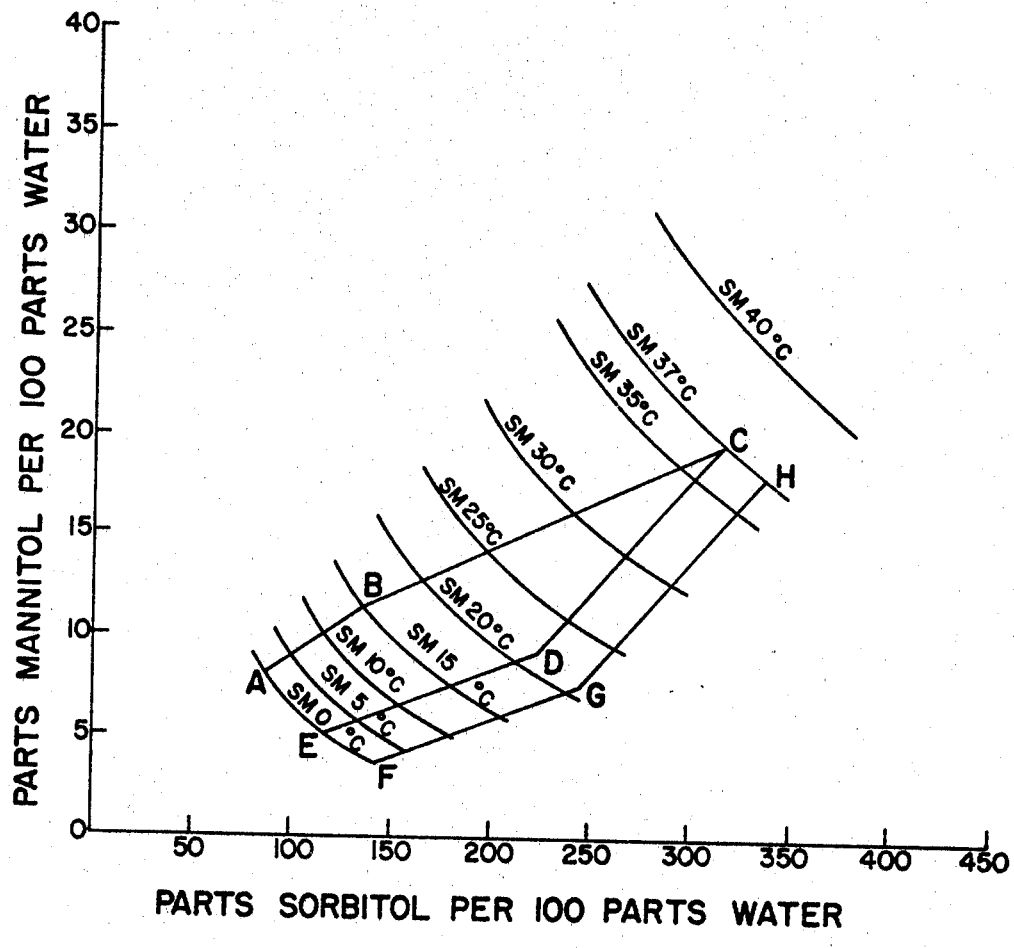

3,484,492
CRYSTALLIZATION OF MANNITOL FROM SORBITOL
Ralph A. Hales, West Chester, Pa., assignor to Atlas Chemical Industries, Inc., Wilmington, Del., a corporation of Delaware
Filed Feb. 27, 1967, Ser. No. 618,937
Int. Cl. C07c *31/26, 29/24*
U.S. Cl. 260—635        14 Claims

ABSTRACT OF THE DISCLOSURE

Crystals containing both sorbitol and mannitol in the same crystal lattice. A process of reducing the mannitol content of solutions containing sorbitol and mannitol by removing the mannitol as sorbitol-mannitol mixed crystals. Under certain conditions, more mannitol may be removed from solutions of mannitol and sorbitol by removing the mannitol in the form of sorbitol-mannitol mixed crystals than can be removed from solution by removing the mannitol in the form of mannitol crystals.

---

This invention relates to the recovery of hexitols from solutions containing sorbitol and mannitol, and to sorbitol-mannitol mixed crystals. More particularly, this invention relates to a process of producing sorbitol solutions of low mannitol content from solutions containing sorbitol and mannitol in admixture, which process comprises the formation of sorbitol-mannitol mixed crystals and separation thereof from the medium in which the crystals are grown.

The expression "sorbitol-mannitol mixed crystals," as used throughout the following specification and appended claims, is intended to mean crystals containing both mannitol and sorbitol in the same crystal lattice.

The reduction of hexoses to hexitols by chemical, electrical, and catalytic methods is well known. The hexitols obtained are determined by the choice of hexose employed and the conditions under which the reduction is carried out. A hexose product, available in quantity at low cost and in high purity, is the equimolar mixture of glucose and fructose known as invert sugar, obtainable by the hydrolysis of ordinary cane sugar (sucrose). When invert sugar is catalytictlly hydrogenated under conditions usual in the industry, the obtained product is a mixture of sorbitol and mannitol usually containing considerably more sorbitol than mannitol.

Prior to the present invention, the quantitative resolution of mixtures of sorbitol and mannitol in an aqueous solution into their components by crystallization processes was not economically practical on a commercial scale. Upon concentration of solution, a considerable proportion of the less soluble mannitol crystallizes out and may be removed by filtering or centrifuging, but its residual solubility in aqueous sorbitol solutions of sufficient water content to permit filtration or centrifugal separations results in a mother liquor containing appreciable quantities of mannitol as well as sorbitol. The partial separation described has been practiced as a means of producing crystalline mannitol and aqueous sorbitol solutions containing about 10% residual mannitol, on total solids in solution, from the readily available invert sugar.

An object of the present invention is to provide a process of preparing sorbitol solutions of low mannitol content from solutions containing sorbitol and mannitol in admixture.

Another object of the present invention is to provide a process of preparing sorbitol solutions containing less than 3% residual mannitol, on total solids in solution, from solutions containing sorbitol and mannitol in admixture.

Another object is to provide a process of efficiently removing mannitol from solutions containing sorbitol and mannitol in admixture.

A further object is to provide a crystalline product comprising sorbitol-mannitol mixed crystals.

A further object is to provide a process of preparing sorbitol-mannitol mixed crystals.

The above and other objects will become apparent from the following description of the invention and from the appended claims.

The drawing shows the solubility equilibrium relationship of sorbitol-mannitol mixed crystals in aqueous solutions of sorbitol and mannitol of various compositions and at various temperatures. The values used to construct the curves shown in the drawing were obtained by addition of small amounts of sorbitol-mannitol mixed crystals to stirred clear super-saturated aqueous solution of known composition followed by slow titrations with small increments of water until the crystals dissolved at constant temperature.

The composition of solutions in equilibrium with sorbitol-mannitol mixed crystals at various temperatures, as shown in the drawing, are more accurately defined by the points given in Table I.

TABLE I.—COMPOSITIONS OF SOLUTIONS IN EQUILIBRIUM WITH SORBITOL-MANNITOL MIXED CRYSTALS

[Grams per 100 grams water]

| °C. | Point 1 | | Point 2 | | Point 3 | |
|---|---|---|---|---|---|---|
|  | Mannitol | Sorbitol | Mannitol | Sorbitol | Mannitol | Sorbitol |
| 40 | 31.2 | 279 | 25.6 | 325 | 21.1 | 375 |
| 37 | 27.9 | 245 | 21.9 | 292 | 16.9 | 351 |
| 35 | 25.9 | 231 | 19.8 | 280 | 15.8 | 330 |
| 30 | 21.8 | 196 | 16.2 | 240 | 12.2 | 293 |
| 25 | 18.5 | 166 | 13.0 | 210 | 9.2 | 267 |
| 20 | 15.9 | 142 | 11.1 | 180 | 7.0 | 245 |
| 15 | 13.6 | 122 | 9.4 | 154 | 6.0 | 206 |
| 10 | 11.7 | 106 | 7.5 | 141 | 5.0 | 181 |
| 5 | 10.2 | 92 | 7.2 | 116 | 4.7 | 151 |
| 0 | 9.0 | 81 | 6.4 | 100 | 3.9 | 136 |

Curved lines are obtained for these data representing sorbitol-mannitol mixed crystals in a direct plot as in the drawing. Straight lines are obtained on plotting the logarithm of these points for a given temperature.

The lines ABC, CDE, and FGH, as shown in the drawing, are more accurately defined by the coordinates given in Table II. AB, BC, CD, DE, FG, and GH are straight lines.

TABLE II

| Coordinate | Grams Sorbitol per 100 grams $H_2O$ | Grams Manitol per 100 grams $H_2O$ |
|---|---|---|
| A | 87 | 8.0 |
| B | 136 | 11.4 |
| C | 316 | 19.5 |
| D | 223 | 9.1 |
| E | 116 | 5.0 |
| F | 142 | 3.6 |
| G | 245 | 7.5 |
| H | 338 | 17.9 |

It has been found, in accordance with the present invention, that the mannitol content of solution containing sorbitol and mannitol in admixture may be reduced by introducing sorbitol-mannitol mixed crystals into a solution of sorbitol and mannitol supersaturated with respect to sorbitol-mannitol mixed crystals, maintaining the temperature below the saturation temperature for sorbitol-mannitol mixed crystals for a sufficient time to grow additional sorbitol-mannitol mixed crystals, and separating aqueous sorbitol solution of lowered mannitol content from the resulting slurry.

The solvent may be water or a mixture of water and water soluble organic solvent, such as acetone, dioxane, the lower aliphatic alcohols, and the like. The preferred water soluble organic solvents are ethanol and methanol. Due to its lower cost and ease of handling, water is the preferred solvent.

The sorbitol-mannitol mixed crystals grown in accordance with the present invention may be separated from the resulting slurry by any of the techniques conventional in the art, such as by filtration or centrifugation. Crystallization may be carried out in batch or continuous crystallizers or a combination thereof.

The saturation temperature for sorbitol-mannitol mixed crystals is, of course, dependent upon the sorbitol, mannitol, and solvent content of the solution and, for any given solution, is readily approximated by adjusting samples of solution to a series of temperatures, stirring in a pinch of sorbitol-mannitol mixed crystals, and observing whether the crystals dissolve or grow. At the exact saturation temperature, of course, they will do neither. If the crystals do not dissolve, solvent may be added slowly, in increments, while stirring at constant temperature until the crystals dissolve. The sorbitol-mannitol mixed crystals curves of the drawing and the data in Table I, for water solutions, may be used as a guide for establishing the ranges of temperatures within which to look for the saturation temperature of a particular aqueous organic solvent solution.

The solution of sorbitol and mannitol, to be treated in accordance with the present invention, may contain from about 3% to about 12% mannitol based on total weight of solids in solution. Solutions having a higher percentage of mannitol based on total weight of solids in solution may also be reduced in mannitol content by the present process. However, if it is desired to recover some of the mannitol separated from sorbitol, it is preferred to first lower the mannitol content by removing mannitol as mannitol crystals, instead of as sorbitol-mannitol mixed crystals. Below about 3% mannitol on total solids, the residual solubility of sorbitol-mannitol mixed crystals in aqueous solutions of sufficient water content to permit filtration or centrifugal separations is such that very little additional mannitol can be removed in the form of mixed crystals. Preferably the solution of sorbitol and mannitol to be treated by separation of sorbitol-mannitol mixed crystals contains from about 6% to about 10% mannitol on total solids. When the solvent is water, the mannitol and sorbitol concentrations are suitably from about 5 parts to about 40 parts mannitol and from about 80 parts to about 300 parts sorbitol per 100 parts of water, and preferably, from about 15 parts to about 30 parts mannitol and from about 150 parts to about 260 parts sorbitol per 100 parts of water.

When the solvent is water, the temperature is usually below about 37° C. At temperatures appreciably above about 37° C. and at concentrations of sorbitol and mannitol wherein the solution is supersaturated with respect to sorbitol-mannitol mixed crystals, the solution is so highly supersaturated with sorbitol and/or mannitol that the addition of sorbitol-mannitol mixed crystals may cause sorbitol crystals and/or mannitol crystals to form. Solutions at temperatures as low as 0° C. have been employed in the formation of sorbitol-mannitol mixed crystals. Although solutions at lower temperatures may be used, the magma tends to gel or become so viscous that stirring and filtration are very difficult. The preferred temperature is from about 5° C. to about 30° C.

The temperature is maintained below the saturation temperature for sorbitol-mannitol mixed crystals for a sufficient time to grow additional sorbitol-mannitol mixed crystals. The sorbitol-mannitol mixed crystals form almost immediately after seeding, especially in solutions which are appreciably supersaturated with respect to these crystals. The length of time the mixed crystals are allowed to grow, before separating the liquid phase from the resulting slurry, will depend upon the amount of mannitol it is desired to remove from solution. It has been found that if the mixed crystals are grown until the liquid phase of the resulting slurry has a composition within the area ABCHGF, and preferably area CDEFGH, as shown in the drawing, more mannitol may be removed from aqueous solution of mannitol and sorbitol by removing the mannitol in the form of sorbitol-mannitol mixed crystals than can be removed by removing the mannitol in the form of mannitol crystals. As shown in the drawing, area A, B, C, H, G, F, is the sum of area A, B, C, D, E, and area C, D, E, F, G, H. If the said liquid phase has a composition above line ABC, no more mannitol has been removed from solution as mixed crystals than can be removed as mannitol crystals. If the mixed crystals are grown until the liquid phase of the slurry has a composition below line FGH, appreciable amounts of sorbitol crystals may form.

The sorbitol-mannitol mixed crystals disclosed herein are of a distinctly different crystalline form from the crystalline forms of mannitol and sorbitol known prior to this invention. Filtered from solution and freed of mother liquir by careful washing, they are found to contain substantially equal portions of mannitol and sorbitol. Under the microscope, the sorbitol-mannitol mixed crystals appear as very fine needles (approximately 1 micron in diameter) of varying length. Examination of the sorbitol-mannitol mixed crystals by infrared spectroscopy, X-ray diffraction, and differential thermal analysis in comparison with mannitol, sorbitol, and mechanical mixtures of mannitol and sorbitol, establishes that the mixed crystals are not mannitol crystals, sorbitol crystals, or a mixture of sorbitol crystals and mannitol crystals, but are crystals containing both mannitol and sorbitol in the same crystal lattice. Another distinguishing characteristic of the mixed crystals, and the preferred method of identification, is their solubility equilibrium relationship in aqueous solutions containing sorbitol and mannitol at various temperatures as shown in the drawing.

The present invention will be better understood from the following examples which are presented for illustrative purposes and are not to be construed as limiting the scope of the appended claims.

Example 1 illustrates the preparation of sorbitol-mannitol mixed crystals from a solution of sorbitol and mannitol using mannitol crystals as seed.

Example 1

212.8 grams of an aqueous solution containing 3.2% mannitol and 96.8% sorbitol, dry basis, and 29.5% water based on total weight, 9.6 grams water, and 0.1 gram of 10% sulfuric acid were added to a flask containing a paddle type agitator and the stirrer turned on. 10 grams of mannitol was added and the mixture heated to dissolve the mannitol. The resulting solution was then cooled to 20° C., seeded with 0.1 gram of mannitol, and stirred in a constant temperature bath at 20 °C. for 43 hours. The crystals which formed were removed by filtration, washed with alcohol and water, and dried under vacuum at room temperature. The crystals were essentially pure sorbitol-mannitol mixed crystals.

The following examples illustrate the crystallization of sorbitol-mannitol mixed crystals from solutions of mannitol and sorbitol using sorbitol-mannitol mixed crystals as seed.

Example 2

1560 grams of an aqueous solution of sorbitol and mannitol containing 200 grams sorbitol and 22.3 grams mannitol per 100 grams water (10% mannitol based on weight of solids) in a flask containing a paddle type agitator was cooled to 22° C. and then 25 grams of dry sorbitol-mannitol mixed crystals and 20 grams of wet sorbitol-mannitol mixed crystals were added. The magma was stirred for 22 hours at 20° C. and for 18 hours at 10° C. The magma was then filtered. The filter cake was essentially pure sorbitol-mannitol mixed crystals and the filtrate contained 3.4% mannitol based on weight of total solids.

Example 3

An aqueous solution of sorbitol and mannitol containing 181 grams of sorbitol and 19.5 grams mannitol per 100 grams of water (10% mannitol based on total solids) was cooled to 5° C. and seeded with sorbitol-mannitol mixed crystals. After stirring for six hours, the resulting magma was filtered. The filter cake was essentially pure sorbitol-mannitol mixed crystals and the filtrate contained 2.9% mannitol based on weight of total solids.

Example 4

An aqueous solution of sorbitol and mannitol containing sorbitol-mannitol mixed crystals was cooled in one hour from 20° C. to 5° C. while stirring and diluting with aqueous sorbitol to a composition of 160 grams sorbitol and 9.4 grams mannitol per 100 grams water (5.5% mannitol based on total solids). The magma was then cooled to 0° C. while stirring for four hours and the resulting magma was filtered. The filter cake was essentially pure sorbitol-manniotl mixed crystals. The filtrate contained 155 grams sorbitol and 5.0 grams mannitol per 100 grams of water (3.1% mannitol based on total solids).

Example 5

1884 grams of an ethyl alcohol-water solution of sorbitol and mannitol containing 48.9% sorbitol, 4.7% mannitol, 34.8% water, and 11.6% ethyl alcohol, based on total weight of solution, (8.8% mannitol based on weight of total solids in solution) was added to a 5 liter flask provided with a stirrer and the solution cooled to 20° C. The solution was seeded with 4 grams of sorbitol-mannitol mixed crystals from Example 2 and stirred at 10° C. for 21 hours. The resulting magma was filtered. The filtrate contained 4.7% mannitol based on weight of total solids. The wet filter cake was essentially pure sorbitol-mannitol mixed crystals.

Example 6

11,380 grams of a solution containing 24.0% sorbitol, 2.1% mannitol, 36.8% water, and 37.1% ethyl alcohol, based on total weight of solution, was added to a 12 liter flask and heated to form a clear solution. The solution was cooled to 8° C. and seeded with 2.5 grams of sorbitol-mannitol mixed crystals. After standing 22 days at 6–7° C. the resulting magma was filtered and the filter cake washed with ethyl alcoohl and dried under vacuum at room temperature to yield 262 grams of essentially pure sorbitol-mannitol mixed crystals containing 50% by weight mannitol.

An X-ray powder diagram of the sorbitol-mannitol mixed crystals of Example 6 was obtained using a Tem-Pres Unit XD–1 diffractometer according to the following procedure. 0.1 gram of sorbitol-mannitol mixed crystals were slurried with ethyl alcohol, placed on a glass slide, and the alcohol evaporated. The mixed crystal sample on the glass slide was about the size of a dime and opaque to light. X-rays from a copper target were passed through a nickel filter and impinged upon the mixed crystal sample. The diffracted X-rays were intercepted by a radiation detector coupled to a strip chart recorder and the diffracted intensity (number of counts per unit time) versus diffraction angle plotted. The d-spacings of the three strongest lines are shown in the following table along with the d-spacings of the three strongest lines from the ASTM powder diagrams for mannitol (ASTM Number 8–753) and sorbitol (ASTM Number 4–0388).

TABLE III

[X-ray powder diagram data. d-Spacings of the three strongest lines in angstroms]

| | | | |
|---|---|---|---|
| Sorbitol-manitol mixed crystals | 9.50 | 4.13 | 4.77 |
| Mannitol | 4.74 | 3.80 | 4.21 |
| Sorbitol | 3.97 | 6.02 | 5.00 |

Differential thermal analysis curves for the sorbitol-mannitol mixed crystals of Example 6, mannitol crystals, and sorbitol crystals were obtained using a Du Pont 900 Differential Thermal Analyzer programed for a temperature rise of 15° C. per minute. The endothermic peaks for each sample are shown in the following table.

TABLE IV.—DIFFERENTIAL THERMAL ANALYSIS DATA

| | Endothermic peaks, ° C. |
|---|---|
| Sorbitol-mannitol mixed crystals | 77 |
| Mannitol | 167 |
| Sorbitol | 100 |

Although this invention has been described with reference to particular embodiments and examples, it will be apparent to those skilled in the art that variations and modifications thereof can be made without departing from the principles and true spirit of the invention.

Having described the invention what is claimed is:

1. Sorbitol-mannitol mixed crystals containing substantially equal proportions of mannitol and sorbitol in the same crystal lattice.

2. A process of reducing the mannitol content of solutions containing sorbitol and mannitol in admixture which comprises:
   (1) introducing sorbitol-mannitol mixed crystals containing substantially equal proportions of mannitol and sorbitol in the same crystal lattice into a solution or sorbitol and mannitol supersaturated with respect to said sorbitol-mannitol mixed crystals,
   (2) maintaining the temperature below the saturation temperature for sorbitol-mannitol mixed crystals for a sufficient time to grow additional sorbitol-mannitol mixed crystals containing substantially equal proportions of mannitol and sorbitol in the same crystal lattice, and
   (3) separating aqueous sorbitol solution of lowered mannitol content from the resulting slurry.

3. The process of claim 2 wherein the temperature is below about 37° C.

4. The process of claim 3 wherein the said solution of sorbitol and mannitol is a water-organic solvent solution.

5. The process of claim 3 wherein the said solution of sorbitol and mannitol is an aqueous solution.

6. The process of claim 5 wherein the resulting slurry has a liquid phase having a composition within the area ABCHGF shown in the drawing.

7. The process of claim 5 wherein the said aqueous solution contains from about 3% to about 12% mannitol based on total solids in solution.

8. The process of claim 7 wherein the temperature is from about 0° C. to about 37° C.

9. The process of claim 8 wherein the said solution of sorbitol and mannitol contains from about 5 parts to about 40 parts mannitol per 100 parts water and from about 80 parts to about 300 parts sorbitol per 100 parts water.

10. The process of claim 9 wherein the resulting slurry has a liquid phase having a composition within the area ABCHGF.

11. The process of claim 9 wherein the said aqueous solution of sorbitol and mannitol contains from about 6% to about 10% mannitol based on total solids in solution.

12. The process of claim 11 wherein the temperature is from about 5° C. to about 30° C. and the said aqueous solution of sorbitol and mannitol contains from about 15 to about 30 parts mannitol per 100 parts water and from about 150 to about 260 parts sorbitol per 100 parts water.

13. The process of claim 12 wherein the resulting slurry has a liquid phase having a composition within the area ABCDE shown in the drawing.

14. The process of claim 12 wherein the said liquid phase has a composition within the area CDEFGH shown in the drawing.

References Cited

UNITED STATES PATENTS

| 2,634,298 | 4/1953 | Himel et al. | 260—637 |
| 2,723,295 | 11/1955 | Pence | 260—637 |
| 2,768,980 | 10/1956 | Pence | 260—637 |

FOREIGN PATENTS

| 582,096 | 8/1959 | Canada. |

LEON ZITVER, Primary Examiner

J. E. EVANS, Assistant Examiner

U.S. Cl. X.R.

260—637

UNITED STATES PATENT OFFICE
CERTIFICATE OF CORRECTION

Patent No. 3,484,492　　　　　　　Dated December 16, 1969

Inventor(s) Ralph A. Hales

It is certified that error appears in the above-identified patent and that said Letters Patent are hereby corrected as shown below:

Column 5, line 36, "sorbitol-manniotl" is misspelled and should read -- sorbitol-mannitol --.
　　　　line 63, "alcoohl" is misspelled and should read -- alcohol --.
Column 6, Table III, the first numerical column, line 3, "3.97" should read -- 3.94 --.
　　　　line 45, "or" should read -- of --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents